United States Patent [19]

Cartwright et al.

[11] Patent Number: 5,711,189
[45] Date of Patent: Jan. 27, 1998

[54] STEERING COLUMN

[75] Inventors: Mark A. Cartwright; James M. Hobaugh, II, both of Lafayette, Ind.

[73] Assignee: TRW Inc., Lyndhurst, Ohio

[21] Appl. No.: 661,663

[22] Filed: May 20, 1996

[51] Int. Cl.$^6$ .............................. B62D 1/18; G05G 5/16; G05G 5/18
[52] U.S. Cl. .............................. 74/493; 74/527; 74/531; 280/775
[58] Field of Search .............................. 74/493, 527, 531; 280/775

[56] References Cited

U.S. PATENT DOCUMENTS

| | | | |
|---|---|---|---|
| 3,302,428 | 2/1967 | Pauwels | 74/493 |
| 3,955,439 | 5/1976 | Meyer | 74/493 |
| 4,075,903 | 2/1978 | Cornell | 74/493 |
| 4,649,769 | 3/1987 | Venable | 74/493 |
| 4,753,121 | 6/1988 | Venable et al. | 74/493 |
| 4,793,204 | 12/1988 | Kubasiak | 74/493 |
| 4,890,505 | 1/1990 | Kinoshita et al. | 74/493 |
| 4,972,732 | 11/1990 | Venable et al. | 74/493 |
| 5,363,716 | 11/1994 | Budzik, Jr. et al. | 74/493 |

*Primary Examiner*—Allan D. Herrmann
*Attorney, Agent, or Firm*—Tarolli, Sundheim, Covell, Tummino & Szabo

[57] ABSTRACT

A steering column has a first steering column member movable axially relative to a second steering column member. A member having a plurality of teeth is connected to the first steering column member and movable with the first steering column member relative to the second steering column member. A support connects the steering column to a vehicle frame. A clamping member has a first position in which the clamping member clamps the member connected to the first steering column member to the support to prevent the first steering column member from moving relative to the second steering column member. The clamping member has a second position in which the clamping member permits the first steering column member to move relative to the second steering column member. A telescope locking member has a first position in which the telescope locking member engages the plurality of teeth on the member connected to the first steering column member to prevent movement of the first steering column member relative to the second steering column member. The telescope locking member has a second position in which the telescope locking member is disengaged from the plurality of teeth on the member connected to the first steering column member to permit axial movement of the first steering column member relative to the second steering column member.

40 Claims, 12 Drawing Sheets

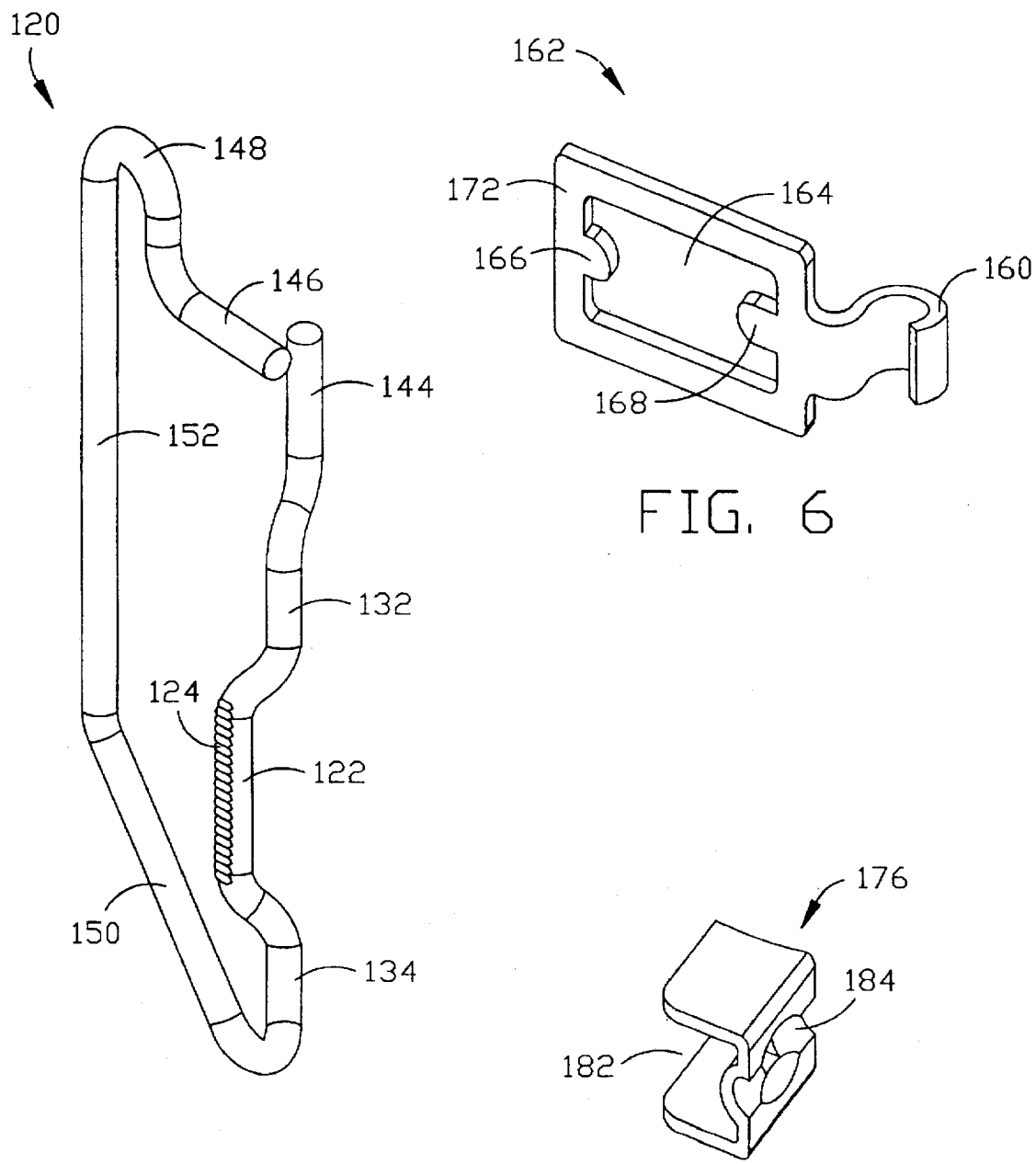

STEERING COLUMN

BACKGROUND OF THE INVENTION

The present invention relates to a steering column, and more specifically to a tilt-telescope steering column.

A known steering column is disclosed in U.S. Pat. No. 5,363,716. U.S. Pat. No. 5,363,716 discloses a steering column in which a first steering column member is axially movable relative to a second steering column member. A jacket tube connected to the first steering column member is movable with the first steering column member relative to the second steering column member. A support connects the steering column to a vehicle frame. A telescope locking mechanism includes a telescope lock bar fixedly attached to the support. The telescope lock bar extends through a tubular member connected with the first steering column member. Springs located within the tubular member are normally tightly wound upon the periphery of the telescope lock bar so that they grip the telescope lock bar and prevent relative movement between the telescope lock bar and the tubular member. Rotation of a lever about an axis of the telescope lock bar causes the springs to become partially unwound and release their grip on the telescope lock bar to permit relative movement between the first and second steering column members.

SUMMARY OF THE INVENTION

The steering column of the present invention includes first and second steering column members. The first steering column member is axially movable relative to the second steering column member. A member having a plurality of teeth is connected to the first steering column member and movable with the first steering column member relative to the second steering column member. A support means connects the steering column to a vehicle frame.

The steering column includes clamping means for clamping the member connected to the first steering column member to the support means. The clamping means has a first position in which the clamping means clamps the member connected to the first steering column member to the support means to prevent the first steering column member from moving relative to the second steering column member. The clamping means has a second position in which the clamping means permits the first steering column member to move relative to the second steering column member.

A telescope locking member is engageable with the plurality of teeth on the member connected to the first steering column member. The telescope locking member has a first position in which the telescope locking member engages the plurality of teeth on the member connected to the first steering column member to prevent movement of the first steering column member relative to the second steering column member. The telescope locking member has a second position in which the telescope locking member is spaced from the plurality of teeth on the member connected to the first steering column member to permit axial movement of the first steering column member relative to the second steering column member.

BRIEF DESCRIPTION OF THE DRAWINGS

The foregoing and other features of the present invention will become apparent to one skilled in the art upon reading the following description of the present invention with reference to the accompanying drawings, wherein:

FIG. 5 is an enlarged pictorial view of a telescope locking member of the steering column of FIG. 1;

FIG. 6 is an enlarged pictorial view of a hook member of a clamping mechanism of the steering column of FIG. 1;

FIG. 7 is an enlarged pictorial view of another member of the clamping mechanism;

DESCRIPTION OF THE PREFERRED EMBODIMENTS

Figure 1:
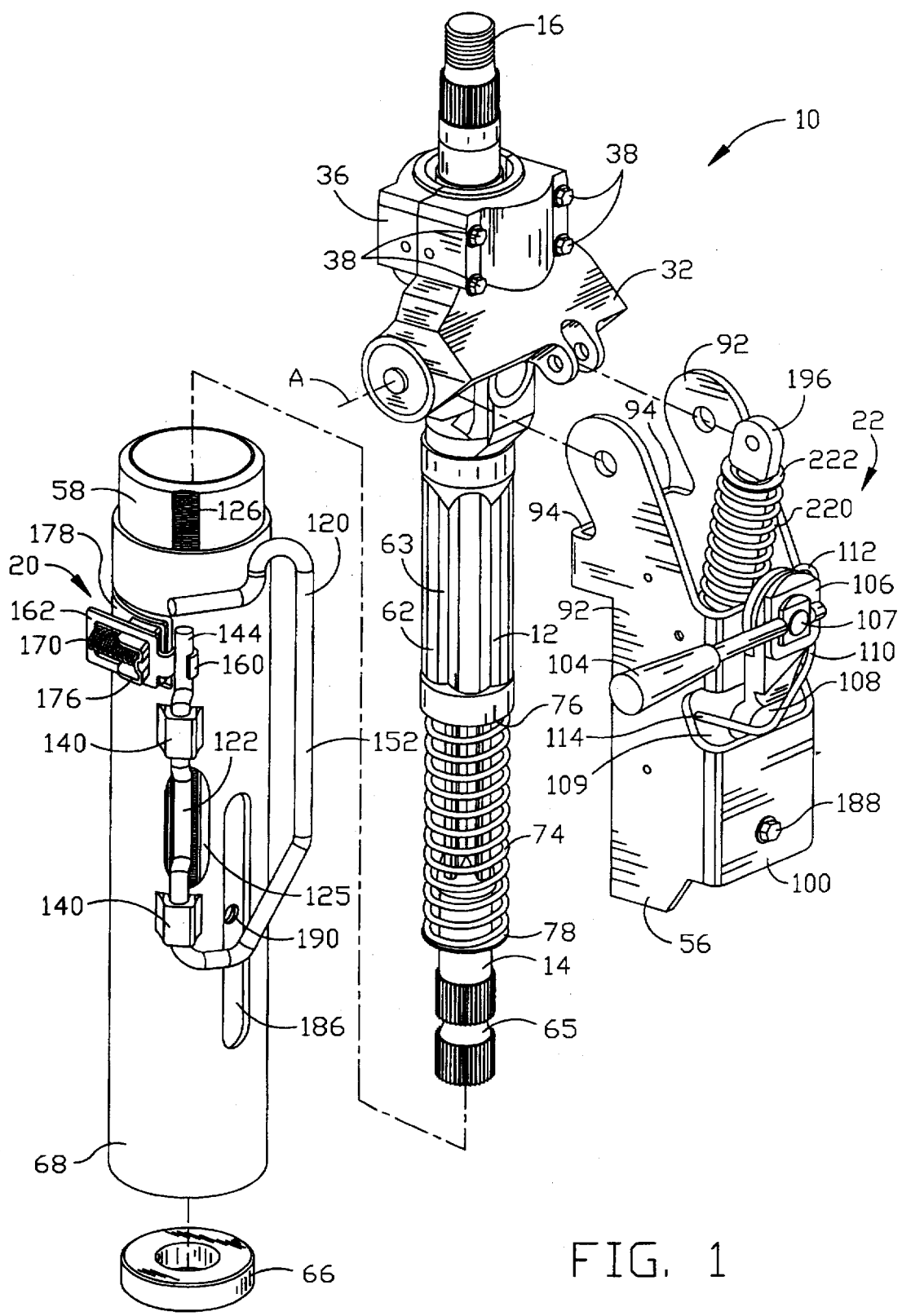
FIG. 1 is an exploded view of a first embodiment of a steering column of the present invention.
Figure 2:
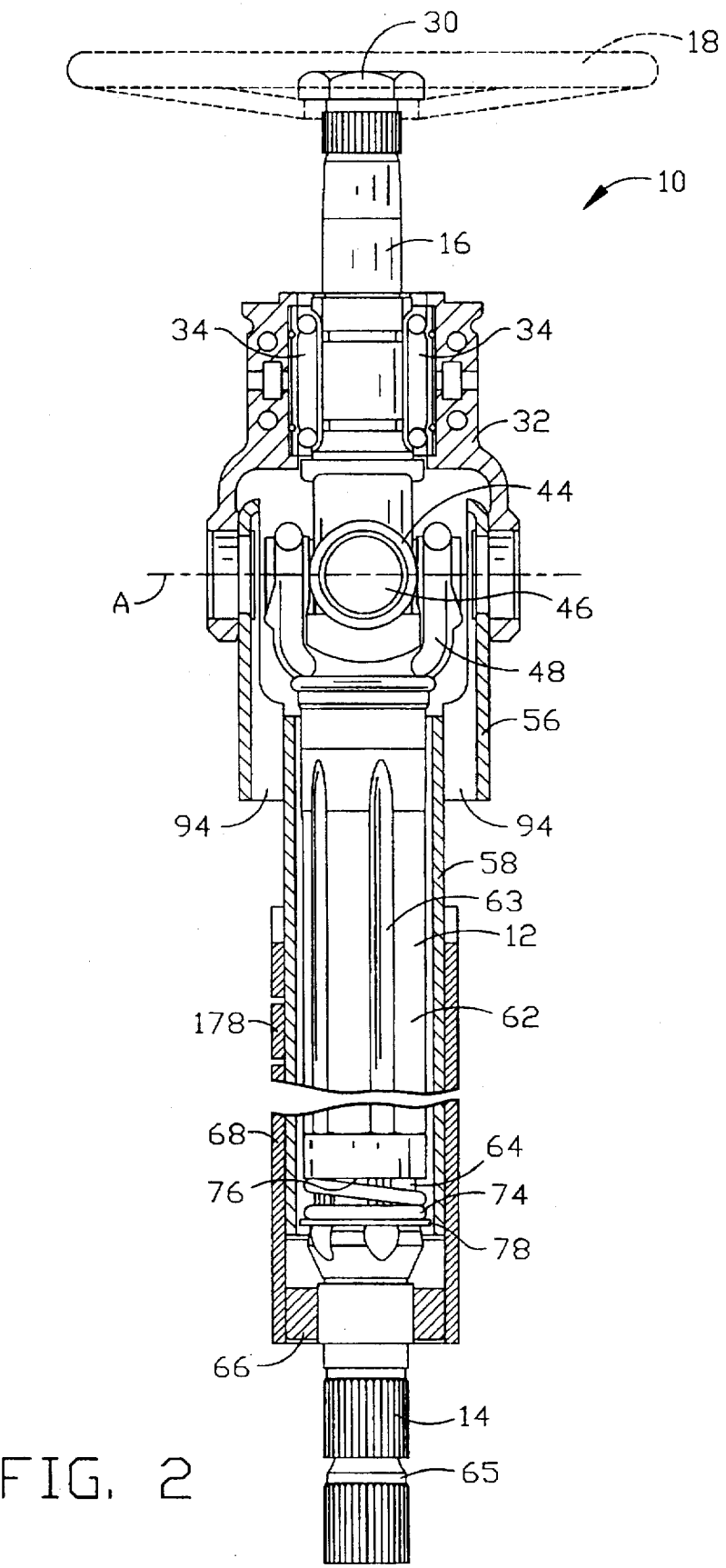
FIG. 2 is a sectional view of the steering column of FIG. 1.

A first embodiment of the present invention comprises an axially and angularly adjustable vehicle steering column 10 (FIG. 1). The steering column 10 includes a pair of steering column members 12, 14 and an input shaft 16. A vehicle steering wheel 18 (FIG. 2) is attached to the input shaft 16 by a nut 30. The input shaft 16 and steering column members 12, 14 rotate upon rotation of the vehicle steering wheel 18. Steering column members 12, 14 telescope to effect axial adjustment of the steering wheel 18. The input shaft 16 is pivotable relative to the steering column member 12 to effect angular adjustment of the steering wheel 18.

A releasable telescope locking mechanism 20 (FIG. 1) locks the steering column members 12, 14 in any one of a plurality of telescope positions. A releasable tilt locking mechanism 22 locks the input shaft 16 in any one of an infinite number of pivot positions relative to the steering column member 12.

The input shaft 16 (FIG. 2) extends into an upper housing 32. Bearings 34 (shown schematically in FIG. 2) are located in the upper housing 32 and support the input shaft 16 for rotation relative to the upper housing 32. A cover 36 (FIG. 1) is connected to the upper housing 32 by screws 38. The cover 36 is removable from the upper housing 32 so that the bearings 34 may be reached for repair and maintenance.

The input shaft 16 is connected to a yoke 44 (FIG. 2) of a universal joint 46. Another yoke 48 of the universal joint 46 is connected to the steering column member 12. The input shaft 16 can pivot, relative to the steering column member 12, about a pivot axis A of the universal joint 46. From the above, it should be clear that upon rotation of the steering wheel 18, the input shaft 16 and steering column member 12 rotate. The upper housing 32 (FIG. 1) is pivotally connected to a bracket 56 which is connected to a jacket tube 58 circumscribing the steering column member 12. The upper housing 32 is pivotable about the axis A relative to the bracket 56 and the jacket tube 58. Therefore, the upper housing 32 pivots along with the input shaft 16 relative to the bracket 56 and the steering column member 12.

The steering column member 14 extends into a lower tubular shaft portion 62 of the steering column member 12 (FIG. 1). The tubular shaft portion 62 has internal splines 63 (FIG. 3) thereon which mesh with external splines 64 on the steering column member 14. The splines 63 of the steering column member 12 mesh with the splines 64 of the steering column member 14 to effect rotation of the steering column member 14 upon rotation of the steering column member 12.

An axial end portion 65 (FIGS. 1 and 2) of the steering column member 14 is connectable to an output shaft (not shown). The output shaft is attached to a steering gear (not shown) of the vehicle. The steering column member 14 is supported by a bearing 66 for rotation relative to a tubular support 68 which is connectable to a frame of the vehicle in any known manner. The bearing 66 is connected inside the support 68 in any known manner. Upon rotation of the steering wheel 18 the input shaft 16 and the steering column members 12, 14 rotate and the rotational movement is transmitted to the output shaft to effect vehicle steering.

The steering column members 12, 14 may be moved axially (telescoped) relative to each other. A spring 74 (FIGS. 1 and 2) circumscribes the steering column member 14. The spring 74 acts between an axial end surface 76 of the steering column member 12 and a flange 78 connected to the steering column member 14. The spring 74 acts to bias the steering column member 12 in a vertical direction, as viewed in FIG. 1, relative to the steering column member 14.

The bracket 56 (FIG. 1) includes generally parallel sidewalls 92. Portions 94 extend radially inwardly from the sidewalls 92 and are connected to an upper portion of the jacket tube 58. A portion 100 of the bracket 56 extends between the sidewalls 92. The bracket 56 partially encloses the telescope locking mechanism 20 and the tilt-locking mechanism 22.

A handle 104 and actuator member 106, connected to the handle, are pivotally mounted on the portion 100 of the bracket 56 by a pin 107. A portion 108 of the actuator member 106 extends into an opening 109 in the portion 100 of the bracket 56. A torsion spring 110 extends around the actuator member 106 to bias the handle 104 and the actuator member to an initial position in which the telescope locking mechanism 20 and the tilt-locking mechanism 22 are locked. The handle 104, actuator member 106, and spring 110 move along with the bracket 56, the jacket tube 58, and the steering column member 12 relative to the steering column member 14.

Figure 3:
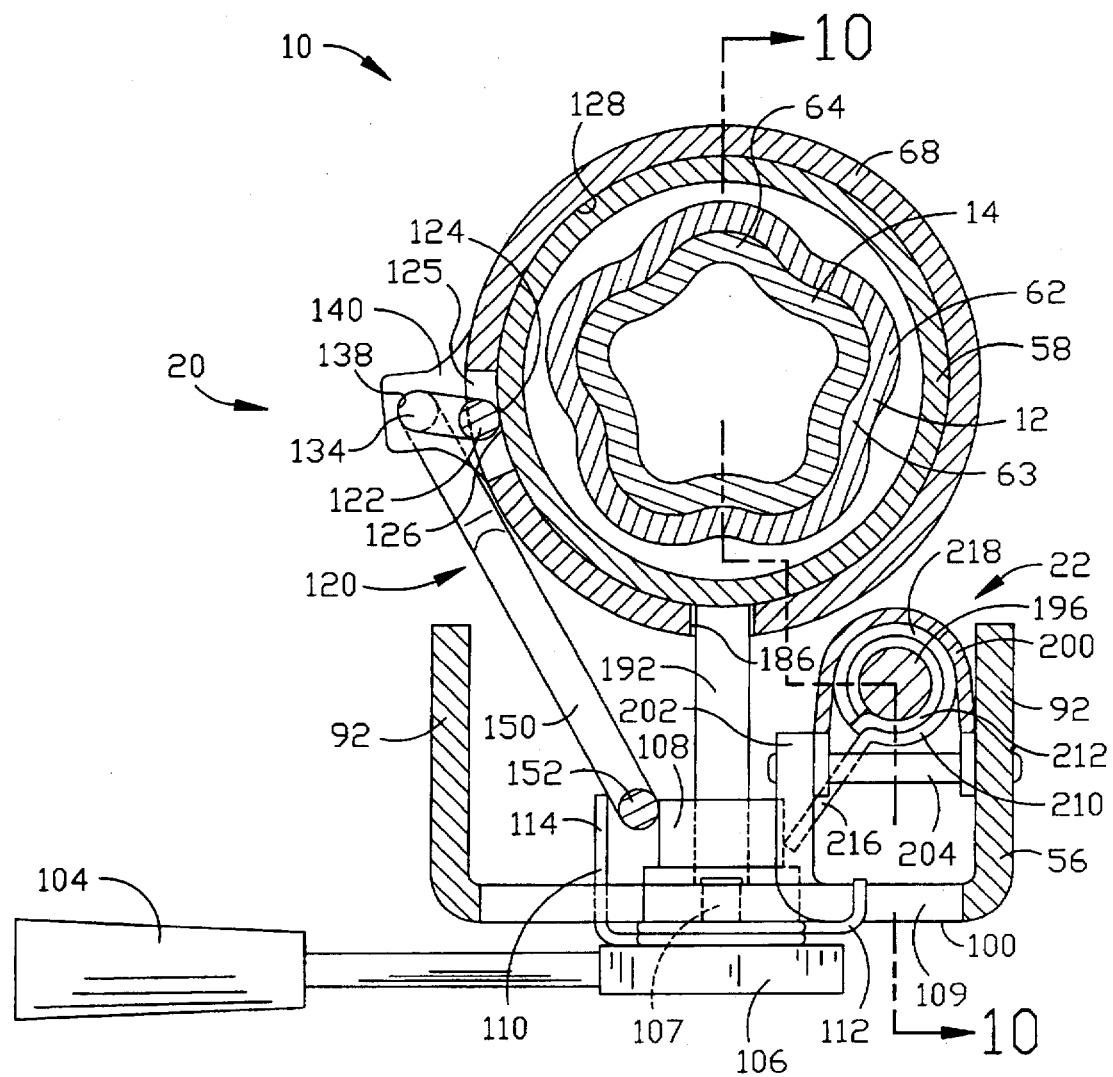
FIG. 3 is another sectional view of the steering column of FIG. 1, showing a telescope locking member of the steering column in a locked position.

An end 112 (FIG. 1) of the spring 110 engages the portion 100 of the bracket 56 and the other end 114 of the spring engages a telescope locking member 120 (FIGS. 1 and 3). The portion 108 of the actuator member 106 also engages the telescope locking member 120. The telescope locking member 120 (FIG. 5) is made from a contoured rod and includes a longitudinally extending portion 122 with a plurality of relatively small teeth 124. The toothed portion 122 extends parallel to the jacket tube 58 and the first and second steering column members 12, 14. The toothed portion 122 extends through a slot 125 (FIG. 1) in the support 68. The teeth 124 of the toothed portion 122 are engageable with a plurality of relatively small teeth 126 on the jacket tube 58.

The number of teeth 124 on the portion 122 of the locking member 120 allows for an almost infinite axial adjustment of the steering column members 12, 14. The teeth 124 and the teeth 126 do not have to mesh exactly. If there is a tooth-to-tooth engagement, the steering column members 12, 14 will still be prevented from moving axially relative to each other since the number of teeth provides sufficient frictional engagement between the locking member 120 and the jacket tube 58.

The telescope locking member 120 (FIG. 5) includes an upper support portion 132 and a lower support portion 134 located on axially opposite sides of the toothed portion 122. The portions 132 and 134 are coaxial and offset from the toothed portion 122. The portions 132 and 134 are pivotally received in openings 138, one of which is shown in FIG. 3, located in pivot supports 140 connected to the tubular support 68 in any known manner.

A portion 144 of the telescope locking member 120 extends from the support portion 132 and is offset from the portions 132 and 134 and from the toothed portion 122. A portion 146 extends adjacent to the portion 144 and toward a curved portion 148. A portion 150 extends at an acute angle from the support portion 134 and toward the actuator member 106. A portion 152 interconnects the curved portion 148 and the portion 150 of the telescope locking member 120.

The portion 144 of the telescope locking member 120 is received in a hook portion 160 of a hook member 162 (FIG. 1). The hook member 162 (FIG. 6) has an opening 164 with tabs 166 and 168 extending into the opening. A preloaded spring 170 (FIG. 1) is received in the opening 164 with the tab 166 extending into a central opening of the spring to retain the spring in the opening 164. The spring 170 acts between a portion 172 of the hook member 162 and a member 176 connected in any known manner to a clamping member 178. The member 176 extends through the opening 164 and has a recess 182 (FIG. 7) which receives the spring 170. A recess 184 on the member 176 is engaged by the tab 168 on the hook member 162 when the telescope locking member 120 is in a released condition.

The clamping member 178 is formed as part of the support member 68. Slots are cut in the support member 68 to form the clamping member 178 so that the clamping member 178 may clamp and release the jacket tube 58. The clamping member 178 extends approximately 180° around the jacket tube 58, as seen in FIG. 8.

Figure 9:
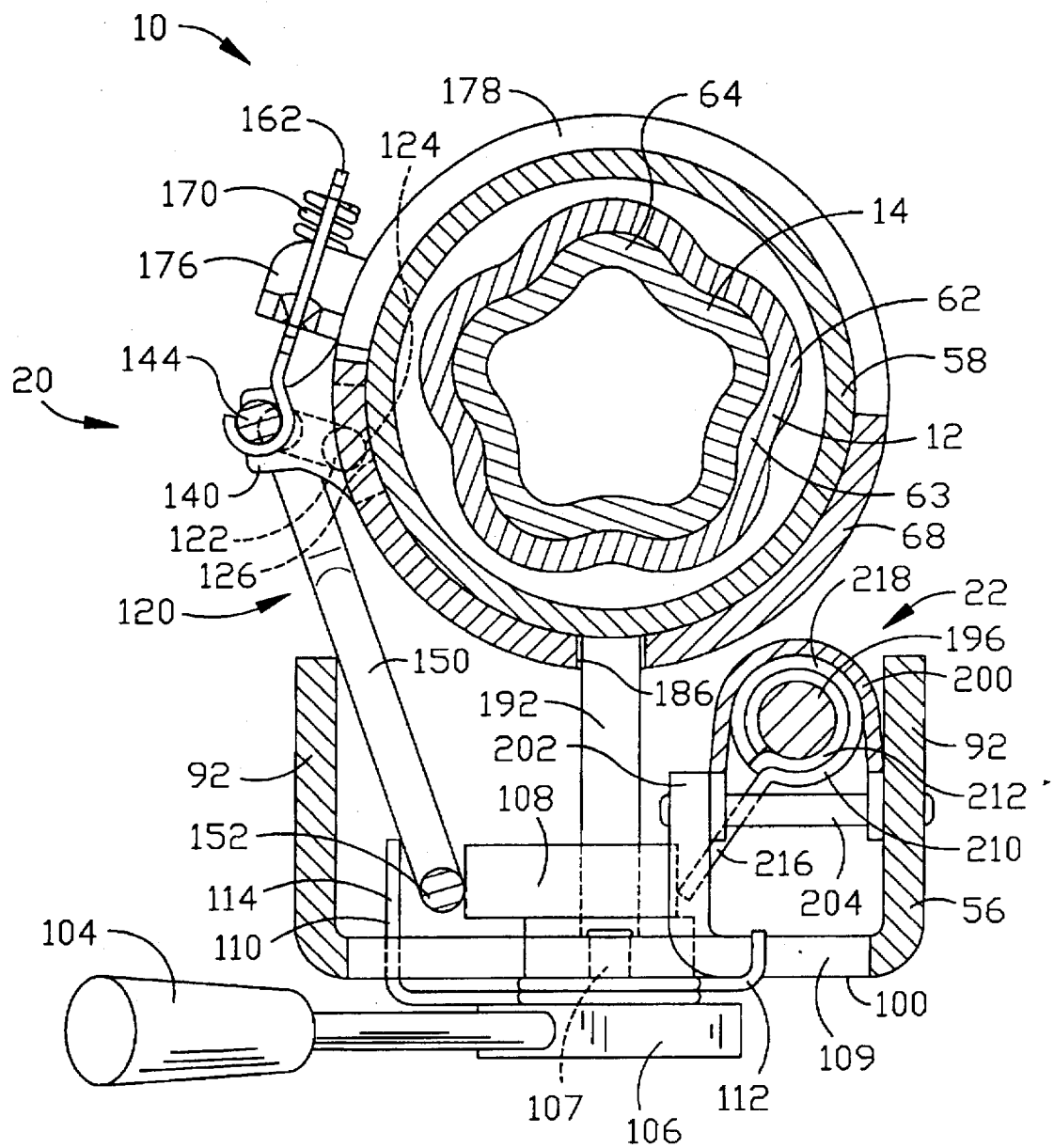
FIG. 9 is a sectional view, generally similar to FIG. 8, showing the clamping mechanism of the steering column in a released condition.

When the clamping member is in a released condition, as shown in FIG. 9, the tab 168 on the hook member engages the member 176 connected to the clamping member. The spring applies a force between the portion 172 of the hook member 162 and the member 176 which is in engagement with the tab 168. Accordingly, the spring 170 does not apply a force to the clamping member 178 since the spring acts between opposite ends of the hook member 162.

Figure 8:
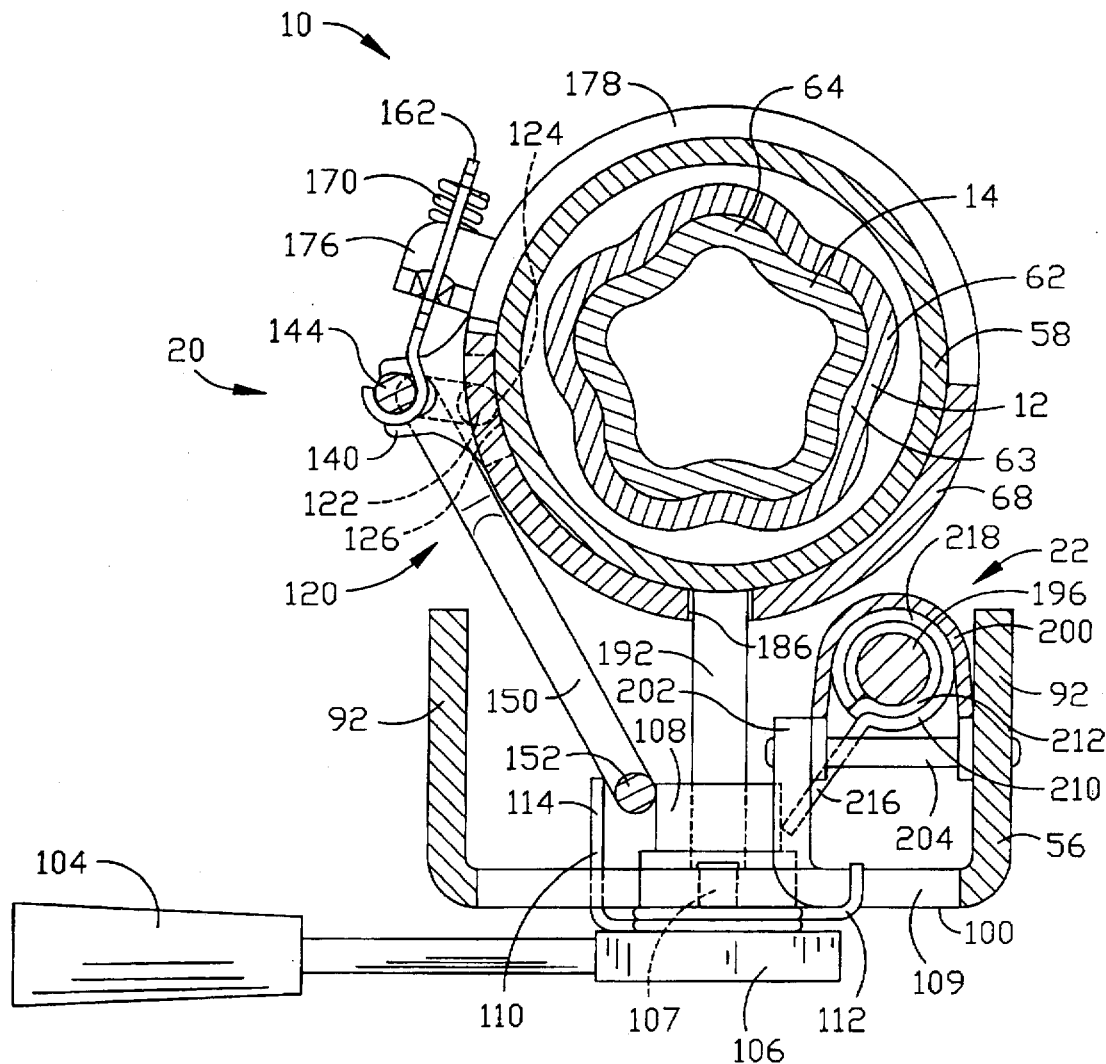
FIG. 8 is a sectional view of the steering column of FIG. 1, showing the clamping mechanism of the steering column in a clamped condition.

As the telescope locking member 120 moves from the position shown in FIG. 9 to the position shown in FIG. 8 the clamping member 178 moves into a clamping condition and clamps the jacket tube 58 against the inner surface 128 of the support 68. The clamping member 178 clamps the jacket tube 58 against the support 68 when the telescope locking member 120 is in a position located between the positions shown in FIGS. 8 and 9. Once the clamping member 178 clamps the jacket tube 58 to the support 68, the clamping member cannot move. The telescope locking member 120 continues to pivot toward the position shown in FIG. 8.

The tab 168 moves away from the member 176 connected to the clamping member 178 and the spring 170 becomes more compressed. When the tab 168 becomes disengaged from the member 176, a force is instantly applied to the clamping member 178 by the spring 170 since the spring is acting between the portion 172 of the hook member 162 and the clamping member. Preferably, the spring 170 is compressed to apply a force of approximately 50 lbs. when the tab 168 moves out of engagement with the member 176. Accordingly, as the telescope locking member 120 moves from the position shown in FIG. 9 to the position shown in FIG. 8 the clamping member 178 clamps the jacket tube 58 to the support 68 before the teeth 124 on the telescope locking member engage the teeth 126 on the jacket tube. The clamping member 178 prevents the jacket tube 58 from moving axially relative to the telescope locking member 120 while the teeth 124 and 126 are partially engaged. Therefore, the teeth 124 and 126 are prevented from wearing due to movement of the teeth 126 relative to the teeth 124.

The tubular support 68 has a longitudinally extending slot 186 (FIG. 1). A bolt 188 extends through an opening in the portion 100 of the bracket 56, through the slot 186, and threadably engages an opening 190 in the jacket tube 58. A sleeve 192 (FIG. 3) circumscribes the bolt 188 and extends between the portion 100 of the bracket 56 and the jacket tube 58. The axial ends of the slot 186 engage the sleeve 192 to define the limits of axial movement of the steering column member 12 relative to the steering column member 14. Also, the bolt 188 and sleeve 192 provide support for the bracket 56.

Figure 10:
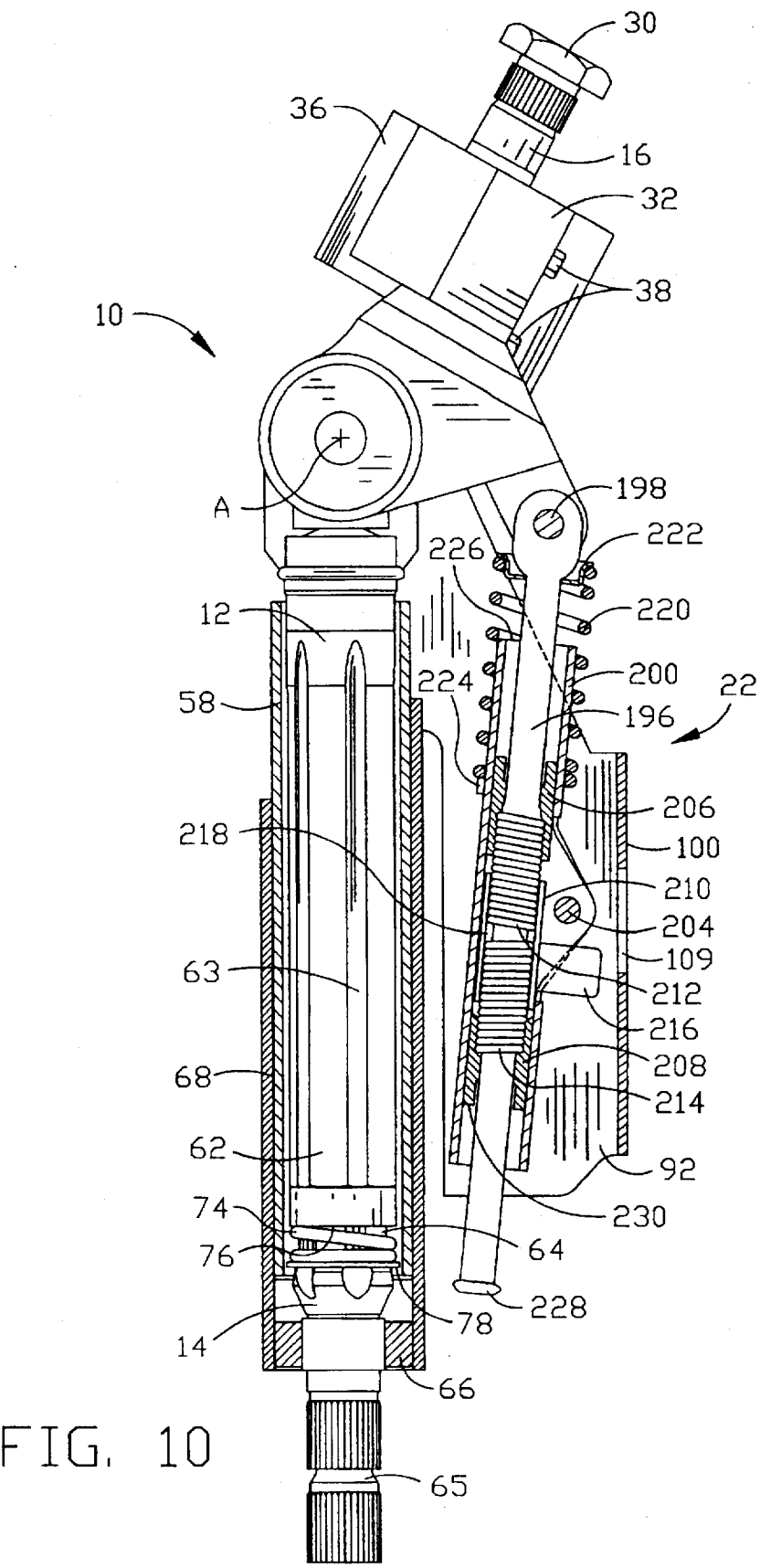
FIG. 10 is a sectional view taken along the lines 10—10 of FIG. 3, showing a tilt-locking mechanism of the steering column.

A tilt-lock bar 196 (FIGS. 1 and 10) is pivotally connected to the upper housing 32 by a pin 198. The tilt-lock bar 196 extends through a tubular member 200 (FIG. 10). The tubular member 200 is pivotally connected between one of the sidewalls 92 of the bracket 56 and a flange 202 (FIG. 3) of the bracket by a pin 204.

A pair of bushings 206 and 208 (FIG. 10) are located within the tubular member 200. The bushings 206 and 208 are connected to the tubular member 200 and support the tilt-lock bar 196 for axial movement relative to the tubular member. The bushings 206 and 208 are located on opposite sides of a lever 210. A coil spring 212 is connected at one end to the bushing 206 and at its other end to the lever 210. Another coil spring 214 is connected at one end to the bushing 208 and at its other end to the lever 210. The springs 212 and 214 are normally tightly wound on the periphery of the tilt-lock bar 196 so that, when fully wound, they grip the tilt-lock bar to prevent relative movement between the tilt-lock bar and the tubular member 200. Rotation of the lever 210 about the axis of the tilt-lock bar 196 causes the springs 212 and 214 to become partially unwound and release their grip on the tilt-lock bar 196.

The lever 210 has a control extension 216 integral with a cylindrical body portion 218 (FIG. 10) engaging the portion 108 of the actuator member 106, see FIG. 3. The body portion 218 extends around portions of the springs 212 and 214. An inner end of each of the springs 212 and 214 is retained between an edge of the body portion 218 and the control extension 216 to fix the inner end of each of the springs to the lever 210. Outer ends of the springs 212 and 214 are fixed within the bushings 206 and 208, respectively, and thus, to the tubular member 200. Accordingly, when the lever 210 is rotated about the tilt-lock bar 196, the outer ends of the springs 212 and 214 cannot be moved about the axis of the tilt-lock bar 196 and the force imparted to the spring by the lever 210 causes the springs to unwind.

A tilt spring 220 extends between a spring retainer flange 222 on the tilt-lock bar 196 and a flange 224 located on the tubular member 200. The tilt spring 222 biases the input shaft 16 to pivot in a counterclockwise direction, as viewed in FIG. 10, relative to the steering column member 12. The spring retainer flange 222 defines an extreme clockwise pivot position of the input shaft 16. When the spring retainer flange 222 of the tilt-lock bar 196 engages an upper surface 226 of the tubular member 200, the input shaft 16 is in the extreme clockwise pivot position. A lower flange 228 of the tilt-lock bar 196 can be received in the tubular member 200 and defines an extreme counterclockwise pivot position of the input shaft 16. When the flange 228 of the tilt-lock bar 196 engages a lower surface 230 of the bushing 208, the input shaft 16 is in the extreme counterclockwise pivot position.

The portion 108 (FIG. 3) of the actuator member 106 that extends into the opening 109 in the bracket 56 engages the portion 152 of the telescope locking member 120 and the lever 210. Upon pivoting the handle 104 and the actuator member 106 in one direction, the actuator member moves the telescope locking member 120 to release the telescope locking mechanism 20. Upon pivoting the handle 104 and the actuator member 106 in another direction, the actuator member moves the lever 210 to unlock the tilt locking mechanism 22.

Figure 4:
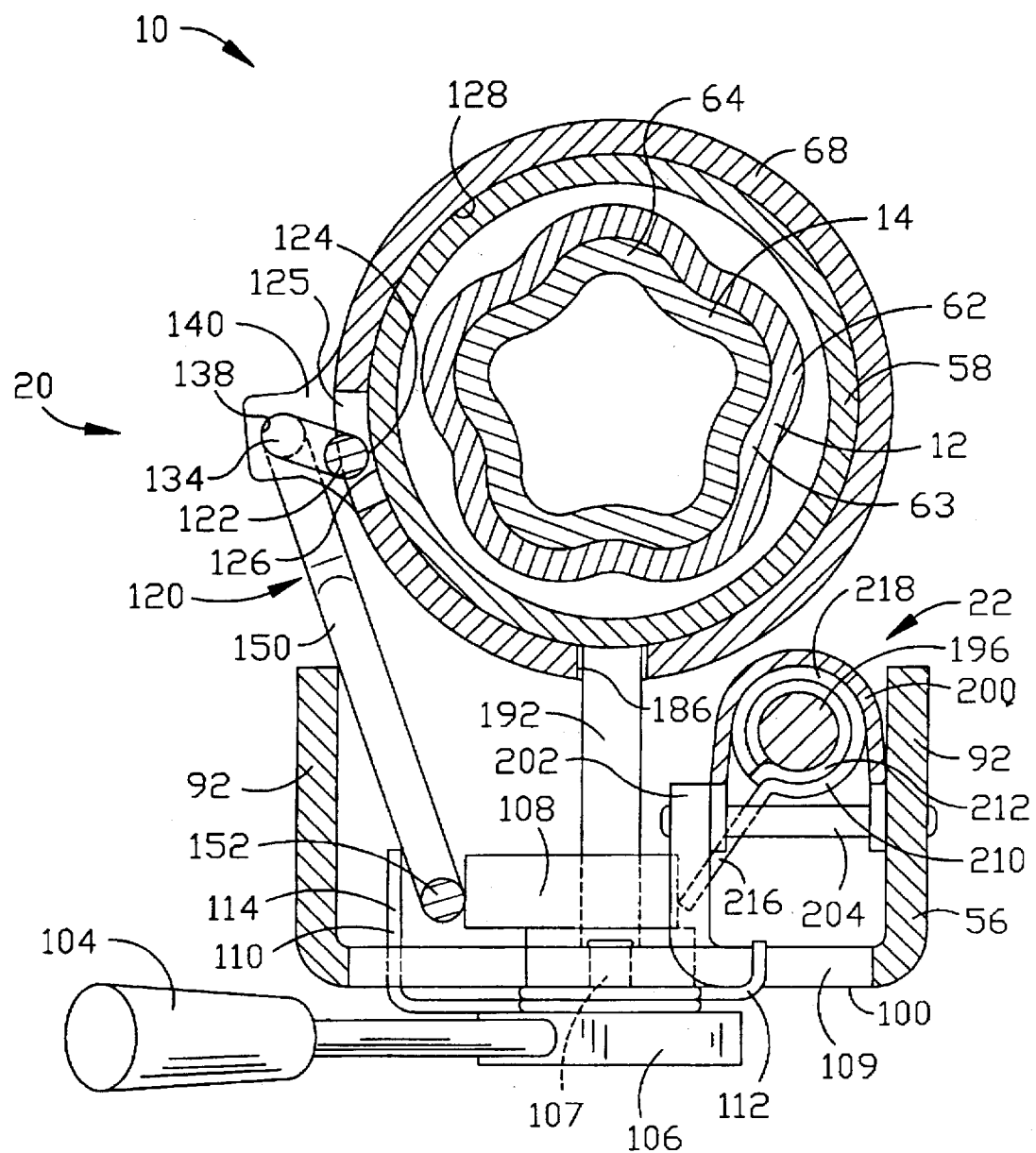
FIG. 4 is a sectional view, generally similar to FIG. 3, showing the telescope locking member of the steering column in an unlocked position.

Upon pivoting of the handle 104 and the actuator member 106 so that the portion 108 moves toward the portion 152 of the telescope locking member 120, the telescope locking member pivots about the axis of the portions 132 and 134. Upon pivotal movement of the telescope locking member 120, the teeth 124 of the portion 122 disengage from the teeth 126 on the jacket tube 58, as seen in FIG. 4. The telescope locking member 120 also releases the jacket tube 58 from being clamped by the clamping member 178, as seen in FIG. 9. The telescope locking member 120 releases the jacket tube 58 and the steering column member 12 can be moved axially, telescoped, relative to the steering column member 14.

Upon release of the handle 104, the spring 110 causes the telescope locking member 120 to pivot from the position shown in FIGS. 4 and 9 to the position shown in FIG. 3 and 8. As the telescope locking member 120 pivots the clamping member 178 is moved to a clamping condition prior to the teeth 124 on the telescope locking member engaging the teeth 126 on the jacket tube 58. After the clamping member 178 is in the clamping condition, the tab 168 moves out of engagement with the member 176 connected to the clamping member 178 as the telescope locking member continues to move toward the position shown in FIGS. 3 and 8. The spring 170 applies an increasing clamping force to the clamping member 178 until the teeth 124 on the telescope locking member 120 engage the teeth 126 on the jacket tube 58. The spring 110 also causes the handle 104 and the actuator member 106 to move to their initial positions. Accordingly, the steering column member 12 is locked in its axial position relative to the steering column member 14.

Upon pivoting of the handle 104 and the actuator member 106 so that the portion 108 of the actuator member moves towards the lever 210, the springs 212 and 214 are unwound to allow the tilt-lock bar 196 to move relative to the tubular member 200. Therefore, the input shaft 16 can pivot relative to the steering column member 12. Upon release of the handle 104 and the actuator member 106 after the input shaft 16 has been pivotally positioned relative to the steering column member 12, the springs 212, 214 and 110 cause the lever 210 to move the handle 104 and the actuator member 106 to their initial positions.

When the tilt-locking mechanism 22 is released, the tilt-lock bar 196 is movable relative to the tubular member 200 and the bracket 56 to position in the input shaft 16 in any one of an infinite number of pivot positions. While adjusting the pivot position of the input shaft, the tilt-lock bar 196 pivots relative to the upper housing 32 and the tilt-lock bar and the tubular member 200 pivot together relative to the bracket 56 about the pin 204.

Figure 11:
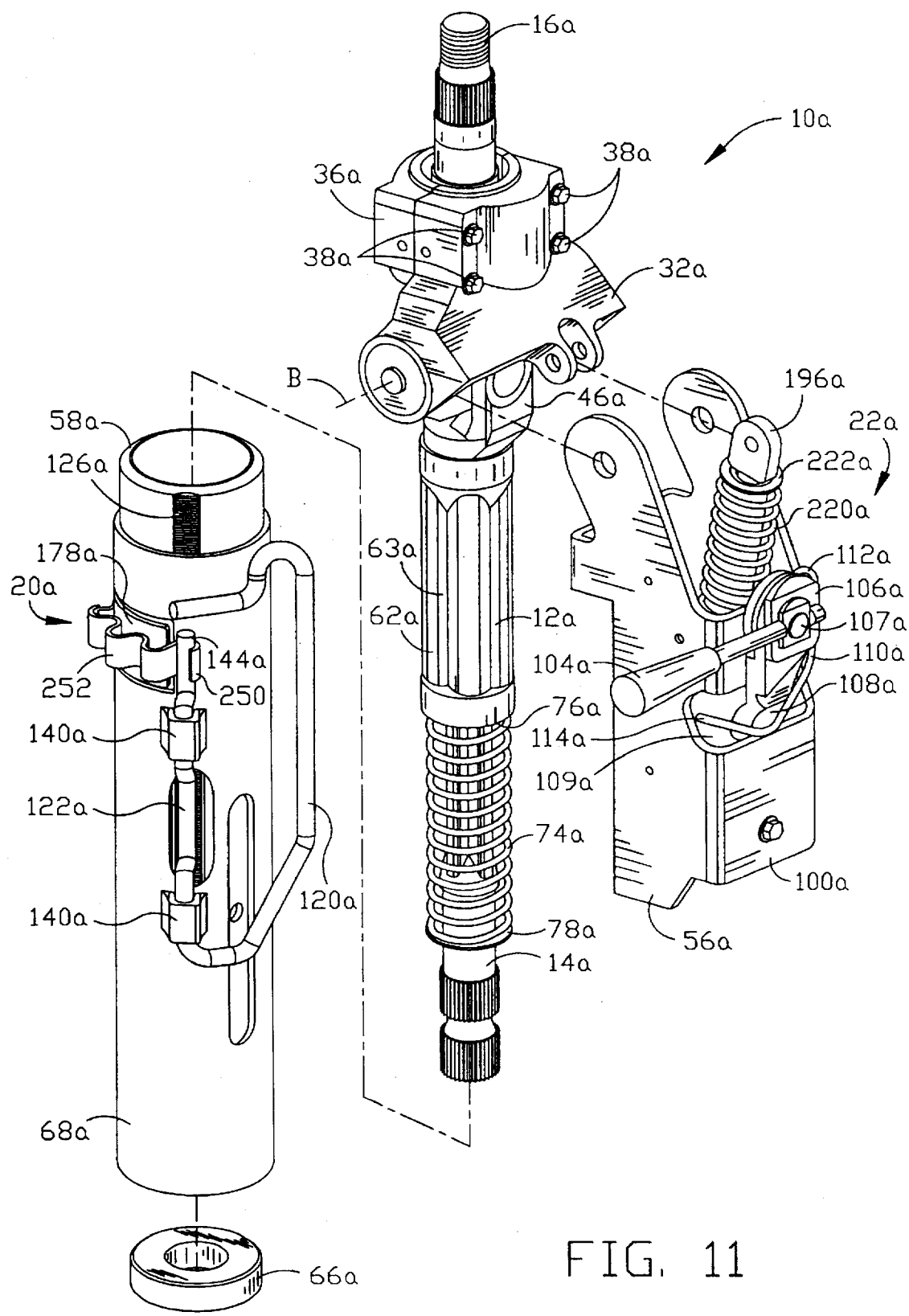
FIG. 11 is an exploded view of a second embodiment of a steering column of the present invention.
Figure 12:
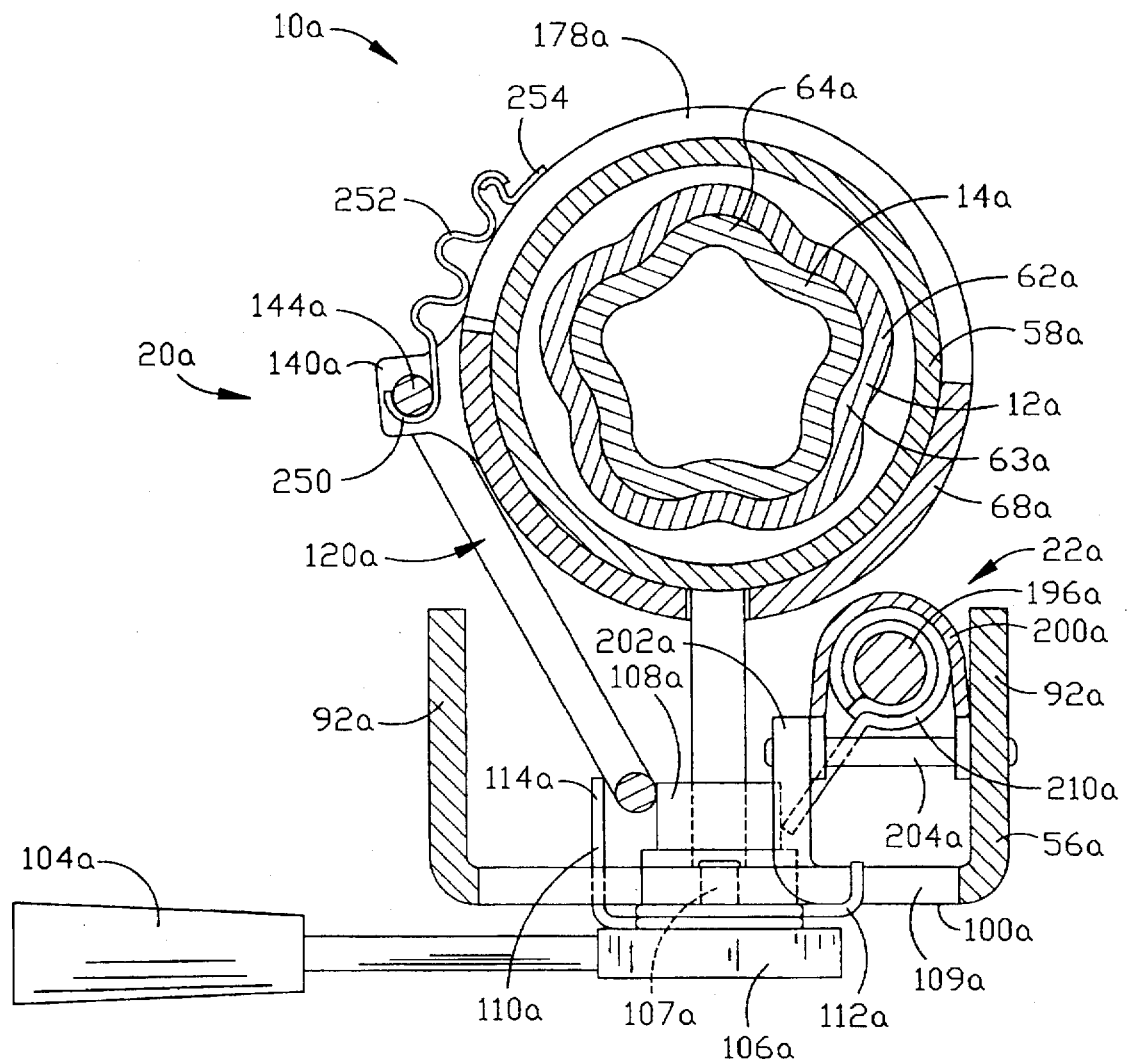
FIG. 12 is a sectional view of the steering column of FIG. 10, showing a clamping mechanism of the steering column.

In the embodiment of the invention illustrated in FIGS. 1–10, the telescope locking mechanism 20 has a preloaded coil spring 170 acting between a hook member 162 and a member 176 connected to a clamping member 178. In the embodiment of the invention illustrated in FIGS. 11–12, the telescope locking mechanism includes an accordion-shaped spring connected to a clamping member. Since the embodiment of the invention illustrated in FIGS. 11–12 is generally similar to the embodiment of the invention illustrated in FIGS. 1–10, similar numerals will be utilized to designate similar components, the suffix letter "a" being associated with the numerals of FIGS. 11–12 to avoid confusion.

An axially and angularly adjustable vehicle steering column 10a (FIG. 11) includes a pair of steering column members 12a, 14a and an input shaft 16a. A vehicle steering wheel (not shown) is attached to the input shaft 16a. The steering column members 12a, 14a telescope to effect axial adjustment of the steering wheel. The input shaft 16a is pivotable relative to the steering column member 12a to effect angular adjustment of the steering wheel.

A releasable telescope locking mechanism 20a (FIG. 11) locks the steering column members 12a, 14a in any one of a plurality of telescope positions. A releasable tilt locking mechanism 22a locks the input shaft 16a in any one of an infinite number of pivot positions relative to the steering column member 12a. The input shaft 16a extends into an upper housing 32a. Bearings (not shown) are located in the upper housing 32a and support the input shaft 16a for rotation relative to the upper housing 32a. A cover 36a is connected to the upper housing 32a by screws 38a.

A universal joint 46a is connected between the input shaft 16a and the steering column member 12a. The input shaft 16a can pivot, relative to the steering column member 12a, about a pivot axis B of the universal joint 46a. The upper housing 32a is pivotally connected to a bracket 56a which is connected to jacket tube 58a. The upper housing 32a is pivotable about the axis B relative to the bracket 56a and the jacket tube 58a. Therefore, the upper housing 32a pivots along with the input shaft 16a relative to the bracket 56a and the steering column member 12a.

The steering column member 14a extends into a lower tubular shaft portion 62a of the steering column member 12a. The tubular shaft portion 62a has internal splines 63a (FIG. 12) thereon which mesh with external splines 64a on the steering column member 14a. The splines 63a of the steering column member 12a mesh with the splines 64a of the steering column member 14a to effect rotation of the steering column member 14a upon rotation of the steering column member 12a. The steering column member 14a is supported by a bearing 66a (FIG. 11) for rotation relative to a tubular support 68a which is connectable to a frame of the vehicle in any known manner. Upon rotation of the steering wheel, the input shaft 16a and the steering column members 12a, 14a rotate and the rotational movement is transmitted to an output shaft (not shown) to effect vehicle steering.

The steering column members 12a, 14a may be moved axially (telescoped) relative to each other. A spring 74a circumscribes the steering column member 14a and acts between an axial end surface 76a of the steering column member 12a and a flange 78a connected to the steering column member 14a. The spring 74a acts to bias the steering column member 12a in a vertical direction, as viewed in FIG. 11, relative to the steering column member 14a.

A handle 104a and an actuator member 106a, connected to the handle, are pivotally mounted on a portion 100a of the bracket 56a by a pin 107a. A portion 108a of the actuator member 106a extends into an opening 109a in the portion 100a of the bracket 56a. A torsion spring 110a extends around the actuator member 106a to bias the handle 104a and the actuator member to an initial position in which the telescope locking mechanism 20a and the tilt-locking mechanism 22a are locked. The handle 104a, actuator member 106a, and spring 110a move along with the bracket 56a, the jacket tube 58a and the steering column member 12a relative to the steering column member 14a.

An end 112a of the spring 110a engages the portion 100a of the bracket 56a and the other end 114a of the spring engages a telescope locking member 120a. The portion 108a of the actuator member 106a also engages the telescope locking member 120a. The telescope locking member 120a includes a portion 122a with a plurality of relatively small teeth for engaging a plurality of relatively small teeth 126a on the jacket tube 58a. The telescope locking member 120a is supported for pivotal movement by supports 140a connected to the support 68a. The telescope locking member 120a includes a portion 144a received in a hook portion 250 (FIGS. 11 and 12) of an accordion-shaped spring 252. A support 254 (FIG. 12) connected to a clamping member 178a connects the accordion-shaped spring 252 to the clamping member.

As the telescope locking member 120a moves from an unlocked position to a locking position the clamping member 178a moves into a clamping condition and clamps the jacket tube 58a to the support 68a. The clamping member 178a clamps the jacket tube 58a against the support 68a when the telescope locking member 120a is still spaced from the teeth 126a on the jacket tube 58a. Once the clamping member 178a engages the jacket tube 58a the clamping member cannot move anymore. The telescope locking member 120a continues to pivot toward engagement with the jacket tube 58a. The accordion-shaped spring 252 stretches as the telescope locking member 120a continues pivoting toward engagement with the jacket tube 58a. As the spring 252 stretches it applies an increasing force to the clamping member 178a. The spring 252 may be made of high strength steel while the support 254 is made of a low strength steel for welding the support to the clamping member 178a.

The tilt-locking mechanism 22a is substantially similar to the tilt-locking mechanism 22 of the embodiment illustrated in FIGS. 1–10, therefore, the tilt-locking mechanism 22a will not be described in detail. A tilt-lock bar 196a (FIG. 11) is pivotally connected to the upper housing 32a. The tilt-lock bar 196a extends through a tubular member 200a (FIG. 12) pivotally connected between a sidewall 92a of the bracket 56a and a flange 202a of the bracket by a pin 204a. A pair of bushings are located within the tubular member 200a. The bushings are connected to the tubular member 200a and support the tilt-lock bar 196a for axial movement relative to the tubular member. Coil springs are connected to the bushings at one of their ends and to a lever 210a at their other ends. The springs are normally tightly wound on the periphery of the tilt-lock bar 196a so that, when fully wound, they grip the tilt-lock bar to prevent relative movement between the tilt-lock bar and the tubular member 200a. Rotation of the lever 210a about the axis of the tilt-lock bar 196a causes the springs to become partially unwound and release their grip on the tilt-lock bar 196a.

A tilt spring 220a (FIG. 11) extends between a spring retainer flange 222a on the tilt-lock bar 196a and a flange located on the tubular member 200a. The tilt spring 220a biases the input shaft 16a to pivot in one direction relative to the steering column member 12a. The spring retainer flange 222a defines one extreme pivot position of the input shaft 16a. A lower flange of the tilt-lock bar 196a defines the other extreme pivot position of the input shaft 16a.

The portion 108a (FIG. 12) of the actuator member 106a that extends into the opening 109a in the bracket 56a engages the telescope locking member 120a and the lever 210a. Upon pivoting the handle 104a and the actuator member 106a in one direction, the actuator member moves the telescope locking member 120a to release the telescope locking mechanism 20a. Upon pivoting the handle 104a and the actuator member 106a in another direction, the actuator member moves the lever 210a to unlock the tilt locking mechanism 22a.

Upon pivoting the handle 104a and the actuator member 106a so that the portion 108a moves toward the telescope locking member 120a, the telescope locking member pivots. Upon pivotal movement of the telescope locking member 120a, the teeth of the portion 122a disengage from the teeth 126a on the jacket tube 58a. The telescope locking member 120a also releases the clamping member 178a. The jacket tube 58a and the steering column member 12a can be moved axially, telescoped, relative to the steering column member 14a.

Upon release of the handle 104a, the spring 110a causes the telescope locking member 120a to pivot so that the teeth on the portion 122a engage the teeth 126a of the jacket tube 58a and the clamping member 178a clamps the jacket tube to the support 68a. The spring 110a also causes the handle 104a and the actuator member 106a to move to their initial positions. Accordingly, the steering column member 12a is locked in its axial position relative to the steering column member 14a.

Upon pivoting the handle 104a and the actuator member 106a so that the portion 108a of the actuator member moves toward the lever 196a, the springs gripping the tilt-lock bar 196a are unwound to allow the tilt-lock bar to move relative to the tubular member 200a. Therefore, the input shaft 16a can pivot relative to the steering column member 12a. Upon release of the handle 104a and the actuator member 106a, after the input shaft 16a has been pivotally positioned relative to the steering column member 12a, the springs cause the lever 210a to move the handle 104a and the actuator member 106a to their initial positions.

Figure 13:
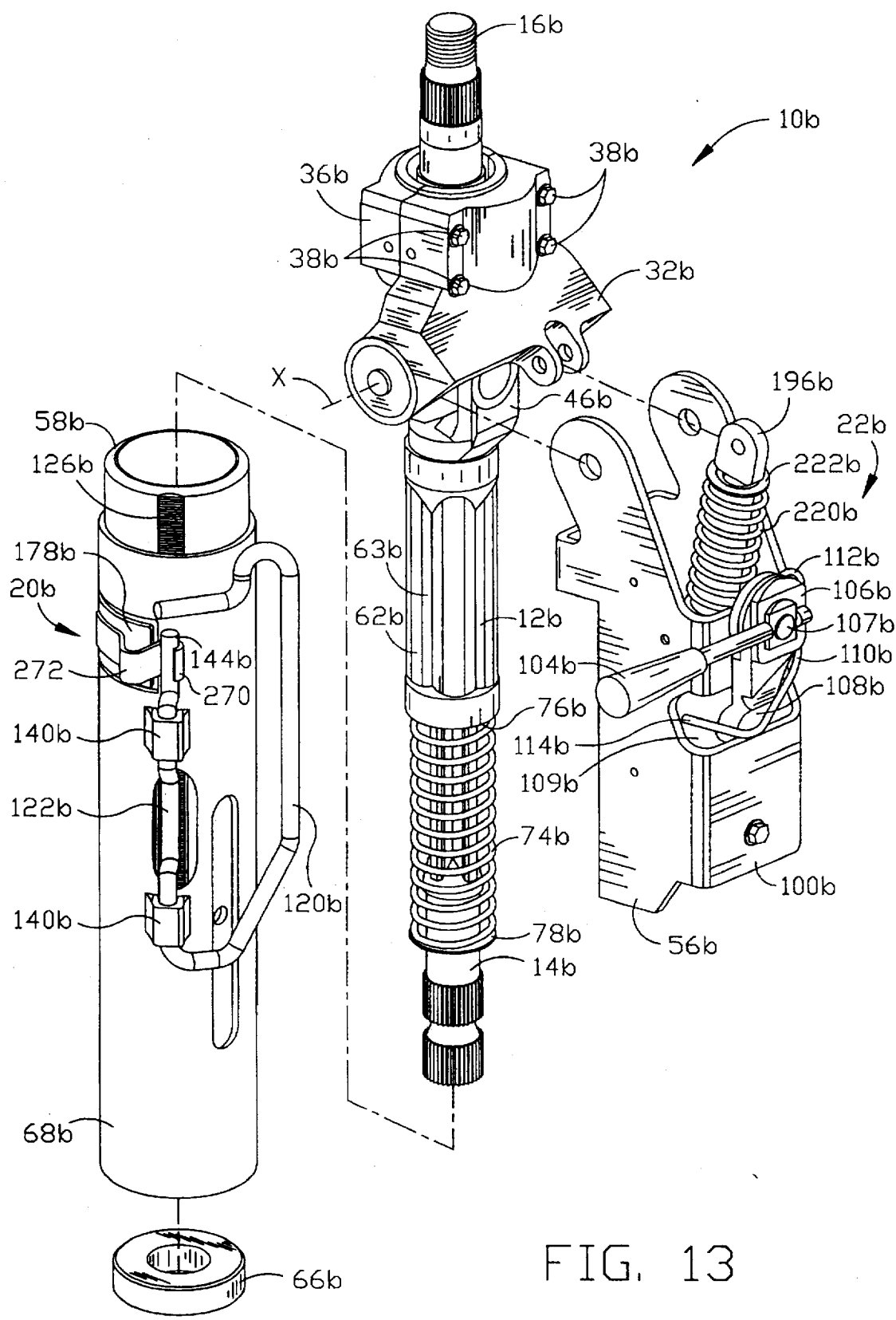
FIG. 13 is an exploded view of a third embodiment of the steering column of the present invention.
Figure 14:
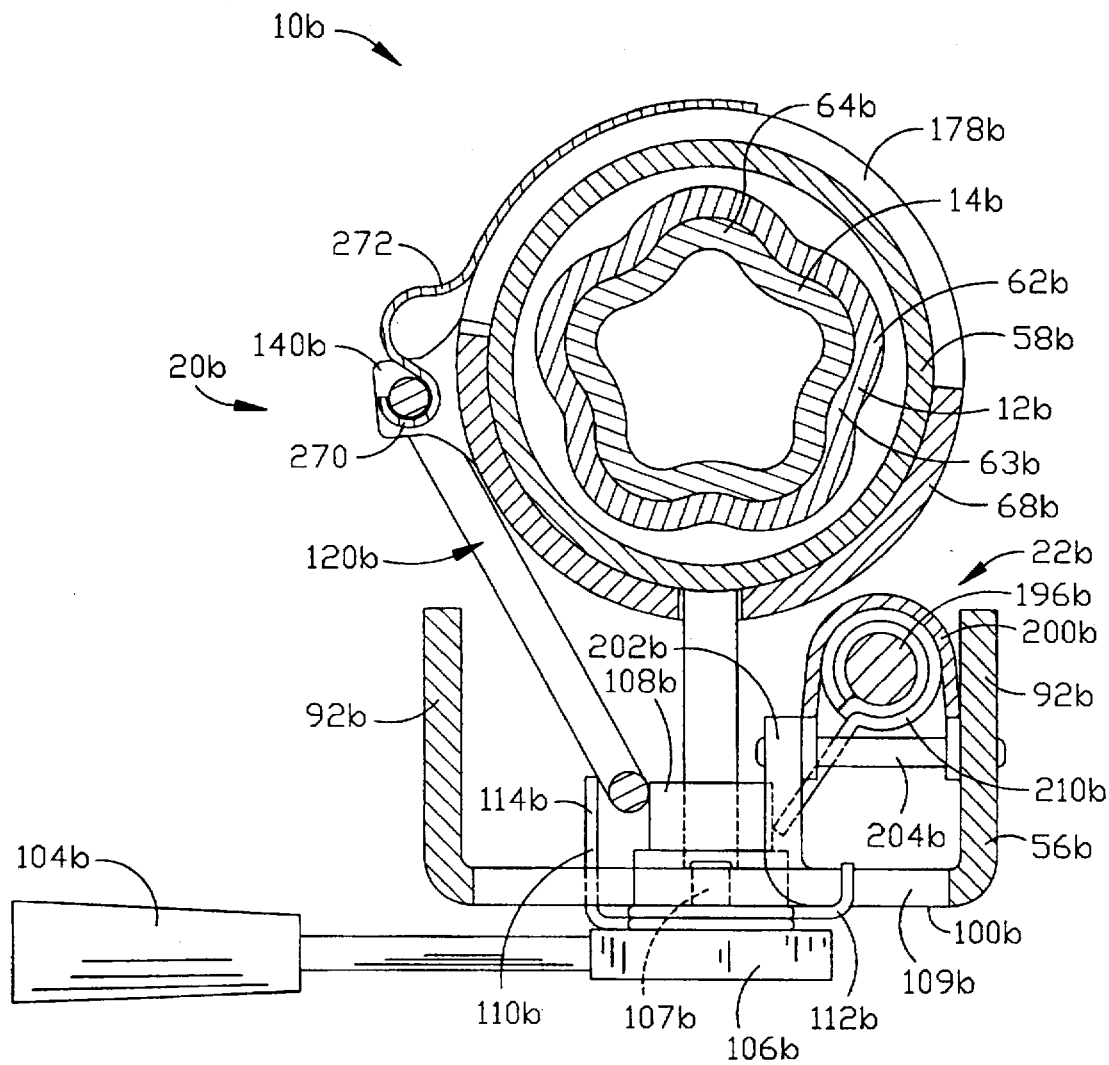
FIG. 14 is a sectional view of the steering column of FIG. 13, showing a clamping mechanism of the steering column.

In the embodiment of the invention illustrated in FIGS. 1–10, the telescope locking mechanism 20 has a preloaded coil spring 170 acting between a hook member 162 and a member 176 connected to a clamping member 178. In the embodiment of the invention illustrated in FIGS. 13–14, the telescope locking mechanism includes a S-shaped spring connected to a clamping member. Since the embodiment of the invention illustrated in FIGS. 13–14 is generally similar to the embodiment of the invention illustrated in FIGS. 1–10, similar numerals will be utilized to designate similar components, the suffix letter "b" being associated with the numerals of FIGS. 13–14 to avoid confusion.

An axially and angularly adjustable vehicle steering column 10b (FIG. 13) includes a pair of steering column members 12b, 14b and an input shaft 16b. A vehicle steering wheel (not shown) is attached to the input shaft 16b. The steering column members 12a, 14a telescope to effect axial adjustment of the steering wheel. The input shaft 16b is pivotable relative to the steering column member 12b to effect angular adjustment of the steering wheel.

A releasable telescope locking mechanism 20b (FIG. 13) locks the steering column members 12b, 14b in any one of a plurality of telescope positions. A releasable tilt locking mechanism 22b locks the input shaft 16b in any one of an infinite number of pivot positions relative to the steering column member 12b. The input shaft 16b extends into an upper housing 32b. Bearings (not shown) are located in the upper housing 32b and support the input shaft 16b for rotation relative to the upper housing 32b. A cover 36b is connected to the upper housing 32b by screws 38b.

A universal joint 46b is connected between the input shaft 16b and the steering column member 12b. The input shaft 16b can pivot, relative to the steering column member 12b, about a pivot axis X of the universal joint 46b. The upper housing 32b is pivotally connected to a bracket 56b which is connected to a jacket tube 58b. The upper housing 32b is pivotable about the axis X relative to the bracket 56b and the jacket tube 58b. Therefore, the upper housing 32b pivots along with the input shaft 16b relative to the bracket 56b and the steering column member 12b.

The steering column member 14b extends into a lower tubular shaft portion 62b of the steering column member 12b. The tubular shaft portion 62b has internal splines 63b (FIG. 14) thereon which mesh with external splines 64b on the steering column member 14b. The splines 63b of the steering column member 12b mesh with the splines 64b of the steering column member 14b to effect rotation of the steering column member 14b upon rotation of the steering column member 12b. The steering column member 14b is supported by a bearing 66b (FIG. 13) for rotation relative to a tubular support 68b which is connectable to a frame of the vehicle in any known manner. Upon rotation of the steering wheel, the input shaft 16b and the steering column members 12b, 14b rotate and the rotational movement is transmitted to an output shaft (not shown) to effect vehicle steering.

The steering column members 12b, 14b may be moved axially (telescoped) relative to each other. A spring 74b circumscribes the steering column member 14b and acts between an axial end surface 76b of the steering column member 12b and a flange 78b connected to the steering column member 14b. The spring 74b acts to bias the steering column member 12b in a vertical direction, as viewed in FIG. 11, relative to the steering column member 14b.

A handle 104b and an actuator member 106b, connected to the handle, are pivotally mounted on a portion 100b of the bracket 56b by a pin 107b. A portion 108b of the actuator member 106b extends into an opening 109b in the portion 100b of the bracket 56b. A torsion spring 110b extends around the actuator member 106b to bias the handle 104b and the actuator member to an initial position in which the telescope locking mechanism 20b and the tilt-locking mechanism 22b are locked. The handle 104b, actuator member 106b, and spring 110b move along with the bracket 56b, the jacket tube 58b and the steering column member 12b relative to the steering column member 14b.

An end 112b of the spring 110b engages the portion 100b of the bracket 56b and the other end 114b of the spring engages a telescope locking member 120b. The portion 108b of the actuator member 106b also engages the telescope locking member 120b. The telescope locking member 120b includes a portion 122b with a plurality of relatively small teeth for engaging a plurality of relatively small teeth 126b on the jacket tube 58b. The telescope locking member 120b is supported for pivotal movement by supports 140b connected to the support 68b. The telescope locking member 120b includes a portion 144b received in a hook portion 270 of a S-shaped spring 272. The S-shaped spring has an end opposite the neck portion 270 connected to a clamping member 178b in any known manner.

As the telescope locking member 120b moves from an unlocked position to a locking position the clamping member 178b moves into a clamping condition and clamps the jacket tube 58b to the support 68b. The clamping member 178b clamps the jacket tube 58b against the support 68b when the telescope locking member 120b is still spaced from the teeth 126b on the jacket tube 58b. Once the clamping member 178b engages the jacket tube 58b the clamping member cannot move anymore. The telescope locking member 120b continues to pivot toward engagement with the jacket tube 58b. The spring 272 stretches as the telescope locking member 120b continues pivoting toward engagement with the jacket tube 58b. As the spring 272 stretches it applies an increasing force to the clamping member 178b.

The tilt-locking mechanism 22b is substantially similar to the tilt-locking mechanism 22 of the embodiment illustrated in FIGS. 1–10, therefore, the tilt-locking mechanism 22b will not be described in detail. A tilt-lock bar 196b (FIG. 13) is pivotally connected to the upper housing 32b. The tilt-lock bar 196b extends through a tubular member 200b (FIG. 14) pivotally connected between a sidewall 92b of the bracket 56b and a flange 202b of the bracket by a pin 204b. A pair of bushings are located within the tubular member 200b. The bushings are connected to the tubular member 200b and support the tilt-lock bar 196b for axial movement relative to the tubular member. Coil springs are connected to the bushings at one of their ends and to a lever 210b at their other ends. The springs are normally tightly wound on the periphery of the tilt-lock bar 196b so that, when fully wound, they grip the tilt-lock bar to prevent relative movement between the tilt-lock bar and the tubular member 200b. Rotation of the lever 210b about the axis of the tilt-lock bar 196b causes the springs to become partially unwound and release their grip on the tilt-lock bar 196b.

A tilt spring 220b (FIG. 13) extends between a spring retainer flange 222b on the tilt-lock bar 196b and a flange located on the tubular member 200b. The tilt spring 220b biases the input shaft 16b to pivot in one direction relative to the steering column member 12b. The spring retainer flange 222b defines one extreme pivot position of the input shaft 16b. A lower flange of the tilt-lock bar 196b defines the other extreme pivot position of the input shaft 16b.

The portion 108b (FIG. 14) of the actuator member 106b that extends into the opening 109b in the bracket 56b engages the telescope locking member 120b and the lever 210b. Upon pivoting the handle 104b and the actuator member 106b in one direction, the actuator member moves the telescope locking member 120b to release the telescope locking mechanism 20b. Upon pivoting the handle 104b and the actuator member 106b in another direction, the actuator member moves the lever 210b to unlock the tilt locking mechanism 22b.

Upon pivoting the handle 104b and the actuator member 106b so that the portion 108b moves toward the telescope locking member 120b, the telescope locking member pivots. Upon pivotal movement of the telescope locking member 120b, the teeth of the portion 122b disengage from the teeth 126b on the jacket tube 58b. The telescope locking member 120b also releases the clamping member 178b. The jacket tube 58b and the steering column member 12b can be moved axially, telescoped, relative to the steering column member 14b.

Upon release of the handle 104b, the spring 110b causes the telescope locking member 120b to pivot so that the teeth on the portion 122b engage the teeth 126b of the jacket tube 58b and the clamping member 178b clamps the jacket tube 58b to the support 68b. The spring 110b also causes the handle 104b and the actuator member 106b to move to their initial positions. Accordingly, the steering column member 12b is locked in its axial position relative to the steering column member 14b.

Upon pivoting the handle 104b and the actuator member 106b so that the portion 108b of the actuator member moves toward the lever 196b, the springs gripping the tilt-lock bar 196b are unwound to allow the tilt-lock bar to move relative to the tubular member 200b. Therefore, the input shaft 16b can pivot relative to the steering column member 12b. Upon release of the handle 104b and the actuator member 106b, after the input shaft 16b has been pivotally positioned relative to the steering column member 12b, the springs cause the lever 210b to move the handle 104b and the actuator member 106b to their initial positions.

Although the telescope locking members of the embodiment are shown as having teeth for engaging teeth on the jacket tubes, it is contemplated that the clamping members alone would prevent axial movement between the steering column members. Therefore, the telescope locking members and jacket tube could be made without teeth.

From the above description of the invention, those skilled in the art will perceive improvements, changes and modifications. Such improvements, changes and modifications within the skill of the art are intended to be covered by the appended claims.

Having described the invention, the following is claimed:

1. A steering column for use in a vehicle having a frame, said steering column comprising:

first and second steering column members, said first steering column member being axially movable relative to said second steering column member;

a member connected to said first steering column member and movable with said first steering column member relative to said second steering column member, said member including a plurality of teeth;

support means for connecting said steering column to the frame of the vehicle;

clamping means for clamping said member connected to said first steering column member to said support means, said clamping means having a first position in which said clamping means clamps said member connected to said first steering column member to said support means to prevent said first steering column member from moving relative to said second steering column member and a second position in which said clamping means permits said first steering column member to move relative to said second steering column member; and a telescope locking member engageable with said plurality of teeth on said member connected to said first steering column member, said telescope locking member having a first position in which said telescope locking member engages at least one of said plurality of teeth on said member connected to said first steering column member to prevent movement of said first steering column member relative to said second steering column member and a second position in which said telescope locking member is spaced from said plurality of teeth on said member connected to said first steering column member to permit axial movement of said first steering column member relative to said second steering column member.

2. A steering column as set forth in claim 1 wherein said clamping means moves from its second position to its first position as said telescope locking member moves from its second position toward its first position, said clamping means being in its first position prior to said telescope locking member reaching its first position as said telescope locking member moves from its second position toward its first position.

3. A steering column as set forth in claim 2 wherein said telescope locking member includes means for moving said clamping means between its first and second positions.

4. A steering column as set forth in claim 1 wherein said clamping means includes a clamping member connected to said support means and extending around a portion of said member connected to said first steering column member, said clamping member having a first position in which said member connected to said first steering column member is clamped to said support by said clamping member and a second position in which said first steering column member is axially movable relative to said second steering column member.

5. A steering column as set forth in claim 4 wherein said telescope locking member includes means for moving said clamping member from its second position to its first position as said telescope locking member moves from its second position toward its first position.

6. A steering column as set forth in claim 5 wherein said telescope locking member has a third position in which said clamping member is in its first position clamping said member connected to said first steering column member and said telescope locking member is spaced from said plurality of teeth on said member connected to said first steering column member.

7. A steering column as set forth in claim 6 further including spring means for connecting said telescope locking member with said clamping member, said spring means permitting said telescope locking member to move from its third position to its first position while said clamping member is in its first position.

8. A steering column as set forth in claim 7 wherein said spring means applies a force to said clamping member when said telescope locking member is in its third position.

9. A steering column as set forth in claim 7 wherein said spring means includes an S-shaped spring connected between said clamping member and said telescope locking member.

10. A steering column as set forth in claim 1 wherein said telescope locking member includes a portion extending parallel to said member connected to said first steering column member, said portion of said telescope locking member having a plurality of teeth engageable with said plurality of teeth on said member connected to said first steering column member.

11. A steering column as set forth in claim 1 wherein said member connected to said first steering column member comprises a jacket tube circumscribing said first steering column member, said support means including a tubular member circumscribing at least a portion of said jacket tube.

12. A steering column as set forth in claim 1 further including means for biasing said telescope locking member to its first position.

13. A steering column as set forth in claim 12 further including an actuator member for moving said telescope locking member from its first position to its second position, said actuator member having a first position in which said telescope locking member is in its first position and a second position in which said telescope locking member is in its second position, said actuator member being movable with said first steering column member relative to said second steering column member and said telescope locking member, said biasing means biasing said actuator member to its first position.

14. A steering column as set forth in claim 1 further including an input shaft connectable with a steering wheel and supported on said first steering column member for pivotal movement relative to said first steering column member about an axis extending transverse to the direction of movement between said first and second steering column members and tilt locking means for locking said input shaft in any one of a plurality of pivot positions relative to said first steering column member.

15. A steering column as set forth in claim 14 wherein said tilt locking means includes means for locking said input shaft in any one of an infinite number of pivot positions relative to said first steering column member.

16. A steering column as set forth in claim 14 further including an actuator member for moving said telescope locking member from its first position to its second position and for unlocking said tilt locking means, said actuator member having a first position in which said telescope locking member is in its first position and said tilt locking means is locked, a second position in which said telescope locking member is in its second position and said tilt locking means is locked, and a third position in which said tilt locking means is unlocked and said telescope locking member is in its first position.

17. A steering column as set forth in claim 16 further including means biasing said actuator member into its first position.

18. A steering column for use in a vehicle having a frame, said steering column comprising:

first and second steering column members, said first steering column member being axially movable relative to said second steering column member;

a member connected to said first steering column member and movable with said first steering column member relative to said second steering column member, said member including a plurality of teeth;

support means for connecting said steering column to the frame of the vehicle;

means for clamping said member connected to said first steering column member to said support means to prevent relative movement between said first and second steering column members;

a telescope locking member engageable with said plurality of teeth on said member connected to said first steering column member for preventing relative movement between said first and second steering column members; and actuator means for releasing said clamping means and moving said telescope locking member to a position in which said telescope locking member is spaced from said plurality of teeth on said member connected to said first steering column member, said actuator means having a first position in which said clamping means clamps said member connected to said first steering column member to said support means and said telescope locking member engages said plurality of teeth on said member connected to said first steering column member, said actuator means having a second position in which said clamping means is in a released condition and said telescope locking member is spaced from said plurality of teeth on said member connected to said first steering column member, said actuator means having a third position in which said clamping means clamps said member connected to said first steering column member to said support means and said telescope locking member is spaced from said plurality of teeth on said member connected to said first steering column member.

19. A steering column as set forth in claim 18 wherein said third position of said actuator member is located between said first and second positions.

20. A steering column as set forth in claim 19 wherein said telescope locking member includes means for moving said clamping means between its released condition and its clamping condition.

21. A steering column as set forth in claim 18 wherein said clamping means includes a clamping member connected to said support means and extending around a portion of said member connected to said first steering column member, said clamping member having a first position in which said member connected to said first steering column member is clamped to said support means by said clamping member and a second position in which said first steering column is axially movable relative to said second steering column member.

22. A steering column as set forth in claim 21 wherein said telescope locking member includes means for moving said clamping member from its second position to its first position as said telescope locking member moves into engagement with said plurality of teeth on said member connected to said first steering column member.

23. A steering column as set forth in claim 22 further including spring means for connecting said telescope locking member with said clamping member, said spring means permitting said actuator member to move from its third position to its first position.

24. A steering column as set forth in claim 23 wherein said spring means applies a force to said clamping member when said actuator member is in its third position.

25. A steering column as set forth in claim 23 wherein said spring means includes an S-shaped spring connected between said clamping member and said telescope locking member.

26. A steering column as set forth in claim 22 wherein said telescope locking member includes a portion extending parallel to said member connected to said first steering column member, said portion of said telescope locking member having a plurality of teeth engageable with said plurality of teeth on said member connected to said first steering column member.

27. A steering column as set forth in claim 22 wherein said member connected to said first steering column member comprises a jacket tube circumscribing said first steering column member, said support means including a tubular member circumscribing at least a portion of said jacket tube.

28. A steering column as set forth in claim 22 further including means for biasing said actuator means to its first position.

29. A steering column as set forth in claim 22 further including an input shaft connectable with a steering wheel and supported on said first steering column member for pivotal movement relative to said first steering column member about an axis extending transverse to the direction of movement between said first and second steering column members and tilt locking means for locking said input shaft in any one of a plurality of pivot positions relative to said first steering column member.

30. A steering column as set forth in claim 29 wherein said tilt locking means includes means for locking said input shaft in any one of an infinite number of pivot positions relative to said first steering column member.

31. A steering column as set forth in claim 30 wherein said tilt locking means is locked when said actuator means is in said first, second, and third positions, said actuator means having a fourth position in which said tilt locking means is unlocked, said clamping means clamping said member connected to said first steering column member of said support means when said actuator means is in its fourth position, said telescope locking member engaging said plurality of teeth on said member connected to said first steering column member when said actuator means is in its fourth position.

32. A steering column as set forth in claims 31 further including means biasing said actuator means into its first position.

33. A steering column for use in a vehicle having a frame, said steering column comprising:

first and second steering column members, said first steering column member being axially movable relative to said second steering column member;

a member connected to said first steering column member and movable with said first steering column member relative to said second steering column member;

support means for connecting said steering column to the frame of the vehicle;

means for clamping said member connected to said first steering column member to said support means to prevent relative movement between said first and second steering column members;

a telescope locking member for releasing said clamping means, said telescope locking member having a first position in which said clamping means clamps said member connected to said first steering column member to said support means and a second position in which said clamping means is in a released condition; and spring means for connecting said telescope locking member with said clamping means, said spring means applying a force to said clamping means when said telescope locking member is in its first position.

34. A steering column as set forth in claim 33 wherein said clamping means includes a clamping member connected to said support means and extending around a portion of said member connected to said first steering column member, said clamping member having a first position in which said member connected to said first steering column member is clamped to said support means by said clamping member and a second position in which said first steering column member is axially movable relative to said second steering column member.

35. A steering column as set forth in claim 34 wherein said spring means includes an S-shaped spring connected between said clamping member and said telescope locking member.

36. A steering column as set forth in claim 33 wherein said telescope locking member includes a portion extending parallel to said member connected to said first steering column member, said portion of said telescope locking member having a plurality of teeth engageable with a plurality of teeth on said member connected to said first steering column member, said teeth on said telescope locking member engaging said teeth on said member connected to said first steering column member when said telescope locking member is in its first position, said teeth on said telescope locking member being spaced from said teeth on said member connected to said first steering column member when said telescope locking member is in its second position.

37. A steering column as set forth in claim 36 wherein said teeth on said telescope locking member engage said teeth on said member connected to said first steering column member when said telescope locking member is in its first position, said teeth on said telescope locking member being spaced from said teeth on said member connected to said first steering column member when said telescope locking member is in its second position, said telescope locking member having a third position in which said clamping means is in a clamping condition and said teeth on said telescope locking member are spaced from said teeth on said member connected to said first steering column member.

38. A steering column as set forth in claim 33 further including an input shaft connectable with a steering wheel and supported on said first steering column member for pivotal movement relative to said first steering column member about an axis extending transverse to the direction of movement between said first and second steering column members and tilt locking means for locking said input shaft in any one of a plurality of pivot positions relative to said first steering column member.

39. A steering column as set forth in claim 38 further including actuator means for moving said telescope locking member between its first and second positions, said actuator member having a first position in which said tilt locking means is locked and said telescope locking member is in its first position, said actuator means having a second position in which said tilt locking means is locked and said telescope locking member is in its second position, said actuator means having a third position in which said telescope locking member is in its first position and said tilt locking means is unlocked.

40. A steering column as set forth in claim 39 further including means biasing said actuator means into its first position.

* * * * *